(12) United States Patent
Knodle et al.

(10) Patent No.: US 9,840,201 B2
(45) Date of Patent: Dec. 12, 2017

(54) STABLE PLATFORM FOR MOTOR VEHICLES

(71) Applicant: Practical Pet Solutions LLC, Seattle, WA (US)

(72) Inventors: Daniel W. Knodle, Seattle, WA (US); Jedediah J. McCann, Seattle, WA (US)

(73) Assignee: Practical Pet Solutions, LLC, Seattle, WA (US)

( * ) Notice: Subject to any disclaimer, the term of this patent is extended or adjusted under 35 U.S.C. 154(b) by 0 days.

(21) Appl. No.: 14/702,180

(22) Filed: May 1, 2015

(65) Prior Publication Data
US 2015/0314733 A1 Nov. 5, 2015

Related U.S. Application Data

(60) Provisional application No. 61/987,874, filed on May 2, 2014.

(51) Int. Cl.
*B60R 3/02* (2006.01)
*B60R 3/00* (2006.01)

(52) U.S. Cl.
CPC ............... *B60R 3/02* (2013.01); *B60R 3/007* (2013.01)

(58) Field of Classification Search
CPC .............. B60R 3/007; B60R 3/00; B60R 3/02
USPC .......... 280/163, 166, 169, 762, 727
See application file for complete search history.

(56) References Cited

U.S. PATENT DOCUMENTS

| | | | | |
|---|---|---|---|---|
| 3,266,594 A * | 8/1966 | Antosh | ............... | B60R 3/00 182/91 |
| 5,738,362 A * | 4/1998 | Ludwick | ............... | B60R 3/02 280/166 |
| 6,237,927 B1 * | 5/2001 | Debo | ............... | B60R 3/02 280/166 |
| 6,659,484 B2 * | 12/2003 | Knodle | ............... | B60R 3/02 248/131 |
| 6,682,086 B1 * | 1/2004 | Erickson | ............... | B60R 3/02 280/163 |
| 6,685,204 B1 * | 2/2004 | Hehr | ............... | B60R 3/02 280/164.1 |
| 6,935,647 B2 | 8/2005 | Knodle et al. | | |
| 7,025,365 B2 | 4/2006 | Bang et al. | | |
| 7,185,904 B1 * | 3/2007 | Jones | ............... | B60R 9/06 280/164.1 |
| 7,195,262 B2 * | 3/2007 | Chaudoin | ............... | B60R 3/007 280/163 |
| 7,204,501 B2 | 4/2007 | Bang et al. | | |
| 7,219,911 B2 * | 5/2007 | Sukonthapanich | ............... | B60R 3/02 280/166 |
| 7,490,889 B1 * | 2/2009 | Scoggins | ............... | B60R 3/007 280/166 |
| 7,503,572 B2 * | 3/2009 | Park | ............... | B60R 3/02 280/163 |
| 7,635,247 B2 * | 12/2009 | Collins | ............... | B60R 9/06 414/462 |

(Continued)

*Primary Examiner* — James M Dolak
(74) *Attorney, Agent, or Firm* — Janeway Patent Law PLLC

(57) ABSTRACT

A stowable platform for motor vehicles which extends beyond the vehicle when in use but is stowed beneath the vehicle. The platform is pivotably secured to an elongated arm which is in turn pivotably secured to the vehicle and is positively locked in both positions.

6 Claims, 10 Drawing Sheets

(56) References Cited

U.S. PATENT DOCUMENTS

| | | | | |
|---|---|---|---|---|
| 7,766,357 B2* | 8/2010 | Arvanites | ............... | B60R 3/007 |
| | | | | 182/127 |
| 7,967,311 B2* | 6/2011 | Phillips | ..................... | B60R 9/06 |
| | | | | 280/163 |
| 9,187,042 B2* | 11/2015 | Kuo | ........................ | B60R 3/02 |
| 9,381,863 B2* | 7/2016 | Blackwell | ............... | B60R 3/007 |
| 9,434,317 B2* | 9/2016 | Nania | ........................ | B60R 3/02 |
| 9,463,746 B2* | 10/2016 | Butlin, Jr. | .................. | B60R 3/02 |
| 9,487,147 B1* | 11/2016 | Morrill | ................... | B60R 3/007 |
| 9,487,148 B2* | 11/2016 | Kichline, Jr. | ............. | B60R 3/02 |
| 9,527,448 B1* | 12/2016 | Kay | .......................... | B60R 3/02 |
| 9,701,249 B2* | 7/2017 | Leitner | .................... | B60R 3/02 |
| 9,701,255 B2* | 7/2017 | Brown | ..................... | B60R 9/00 |
| 2004/0256833 A1* | 12/2004 | Cervenka | .................. | B60R 3/007 |
| | | | | 280/163 |
| 2006/0170179 A1* | 8/2006 | Dahl | ........................ | B60R 3/02 |
| | | | | 280/163 |

* cited by examiner

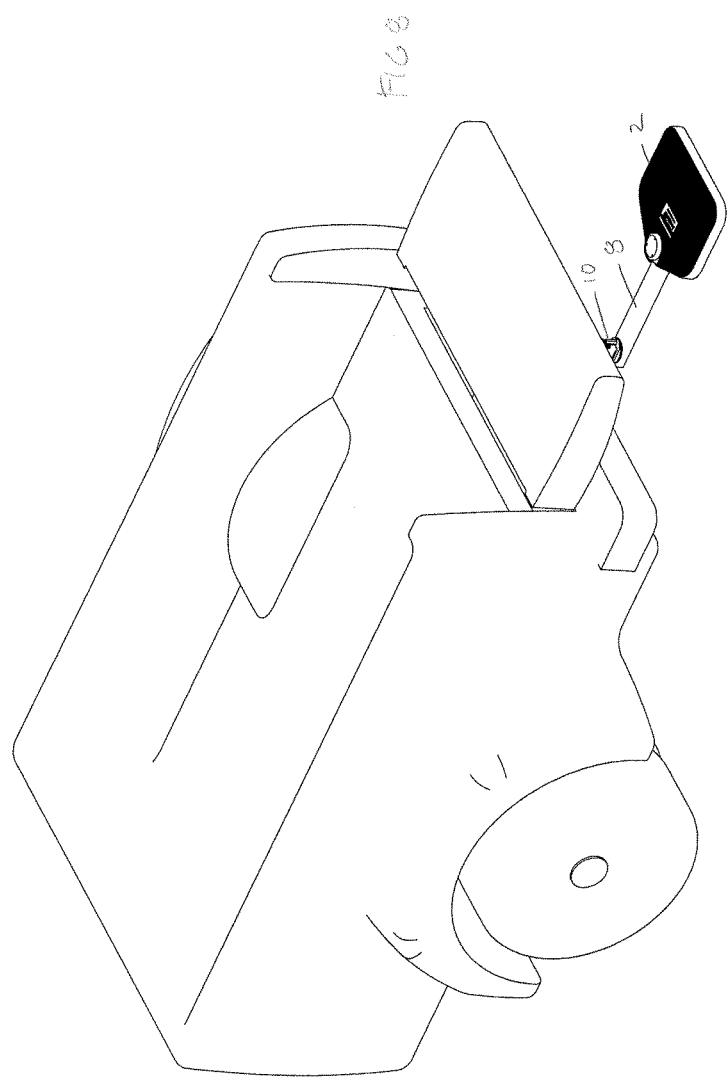

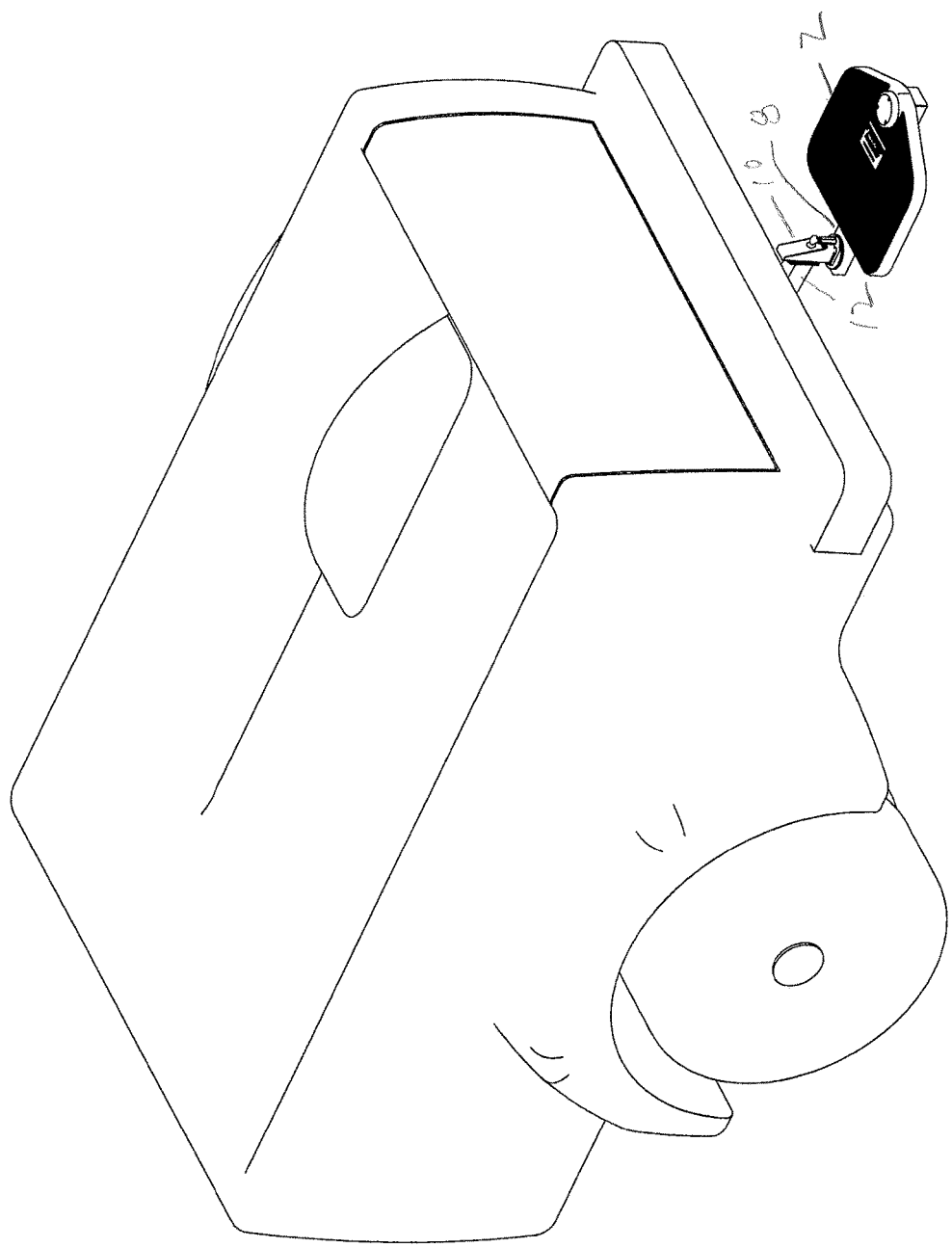

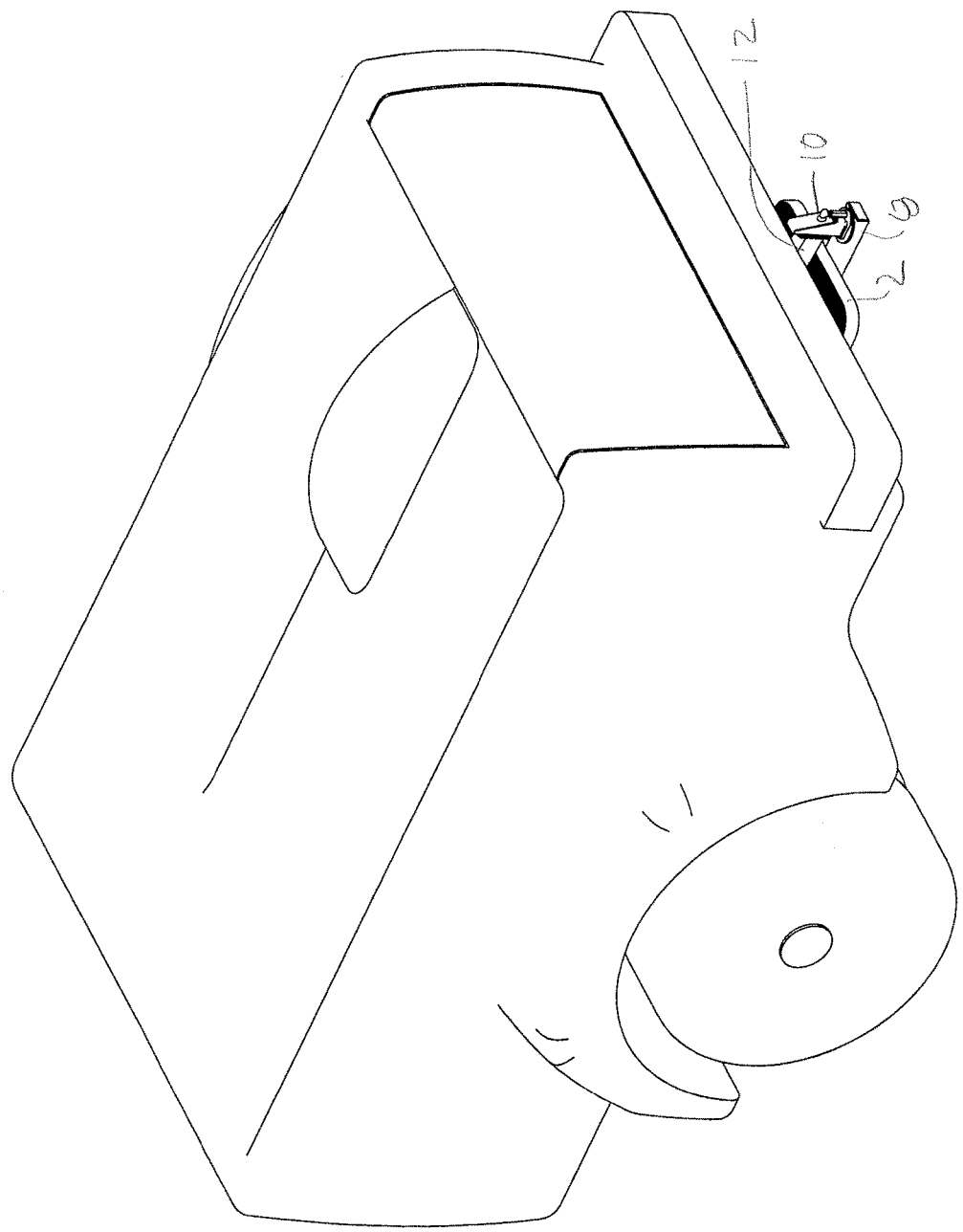

STABLE PLATFORM FOR MOTOR VEHICLES

Provisional application No. 61/987,874 filed May 2, 2014 is hereby incorporated by reference thereto.

TECHNICAL FIELD

The present invention relates to a retractable platform moveable from a stowed position beneath a vehicle and an operable position extending beyond the vehicle. More particularly, the invention relates to pickup trucks, wherein the platform needs to extend beyond the open tailgate and yet remain stable and safe. The platform is selectively locked in prescribed positions and requires deliberate action to unlock.

BACKGROUND OF THE INVENTION

The need for a step for assistance into a vehicle has long been recognized, as illustrated by the running board typically found on older pickup trucks and by accordion-type steps which collapse inside a motor home or trailer. It has further been recognized that oftentimes, pets need assistance to get into or out of vehicles such as SUVs or pickup trucks and yet such apparatus needs to be out of the way when not in use.

Prior art which recognized the above needs is illustrated by U.S. Pat. No. 6,935,647 granted to Knodle et al on Aug. 30, 2005, which discloses a stowable step formed of a unitary element pivotably but removably secured to the receiver of a trailer hitch. The step is locked in its selected position.

Another stowable platform is disclosed in U.S. Pat. No. 7,025,365 granted to Bang et al on Apr. 11, 2006. This disclosure illustrates a platform that is removably secured to a trailer hitch secured in the stowed position beneath the vehicle or in the extended position, but further is capable of further extension or elevation.

U.S. Pat. No. 7,204,501 discloses a universal stowable step which can be adjusted upon installation to accommodate a large variety of vehicles, adaptable to fit different trailer hitch sizes and vehicles of differing heights. Stability and security are enhanced.

SUMMARY OF THE INVENTION

With the above-noted prior art in mind, the present invention provides a stowable platform for pickup trucks which is lighter in weight, has fewer parts and is adjustable in height to accommodate differing vehicle clearances to accommodate spare tires, exhaust systems or the like.

Further, the present invention provides a stable retractable platform for pickup trucks, wherein the securement feature is enhanced, more user-friendly and requires deliberate action to unlock.

BRIEF DESCRIPTION OF THE DRAWINGS

FIG. 8 is the inventive step in a fully extended position relative to a vehicle.

FIG. 9 is the inventive step in an intermediate position relative to a vehicle.

FIG. 10 is the inventive step in a fully retracted position relative to a vehicle.

BEST MODE FOR CARRYING OUT THE INVENTION

Figure 1:
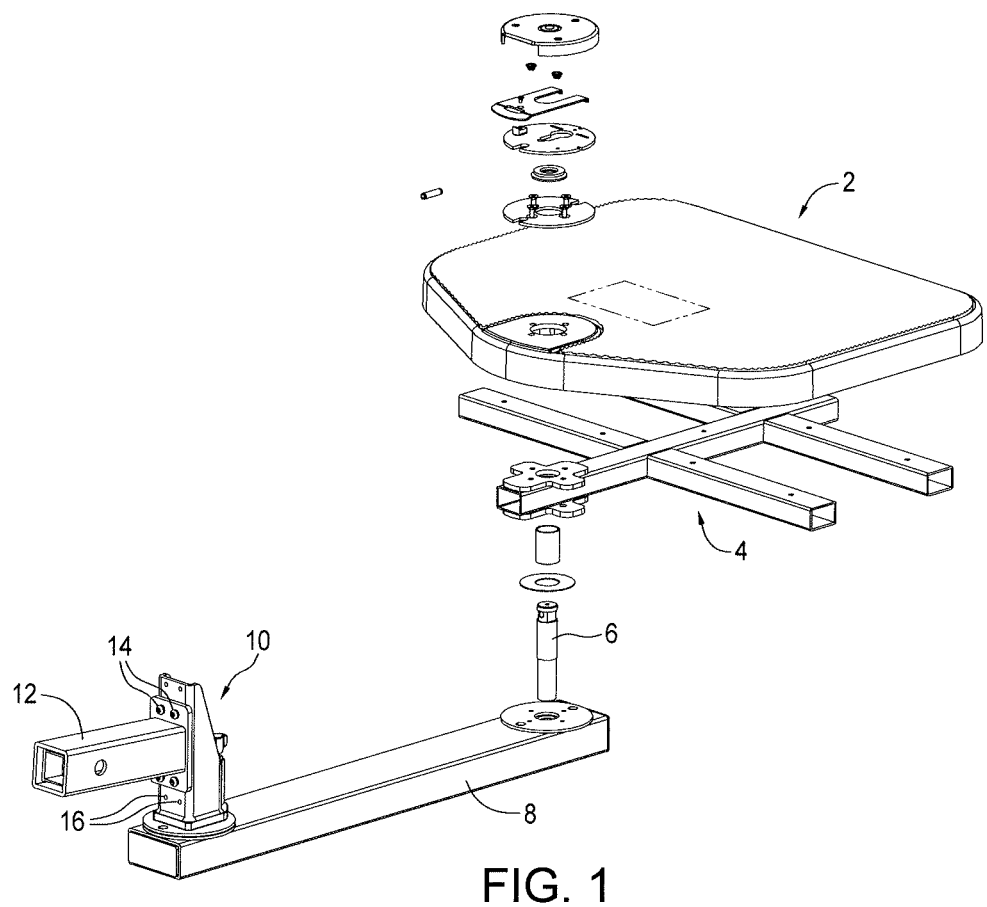
FIG. 1 is a partially exploded view of the inventive stowable step.

As seen in FIG. 1, the stable retractable platform comprises a platform 2 stabilized and reinforced by framework 4 pivotably mounted on a shaft 6 and locked in the desired position by a mechanism to be explained hereinafter.

The shaft 6 is fixedly secured to a hollow beam or arm 8 which is pivotably secured to an inboard latching mechanism 10, to be explained hereinafter, which is removably secured to a trailer hitch receiving tube (not shown) by rearwardly extending tube 12. It is to be noted that latching mechanism 10 is secured to the end of tube 12 by threaded fasteners 14 which are selectively secured in bores 16, permitting vertical adjustment.

Figure 2:
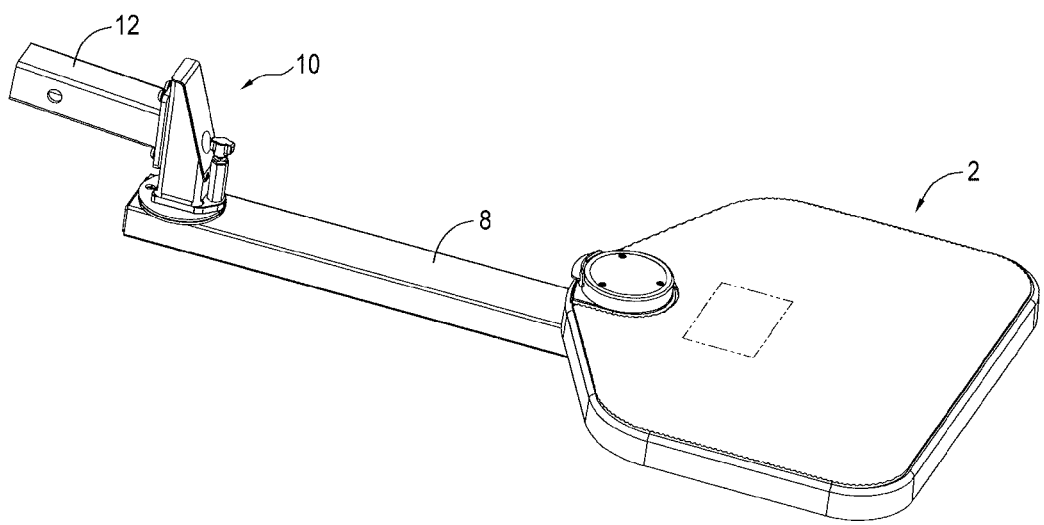
FIG. 2 is the inventive step in the extended position.

Reference is now had to FIG. 2, wherein the platform 2 is deployed in a position which would extend beyond an open pickup tailgate. Arm or beam 8 as well as platform 2 are in their outermost position, where they would be locked for stability and security.

Figure 3:
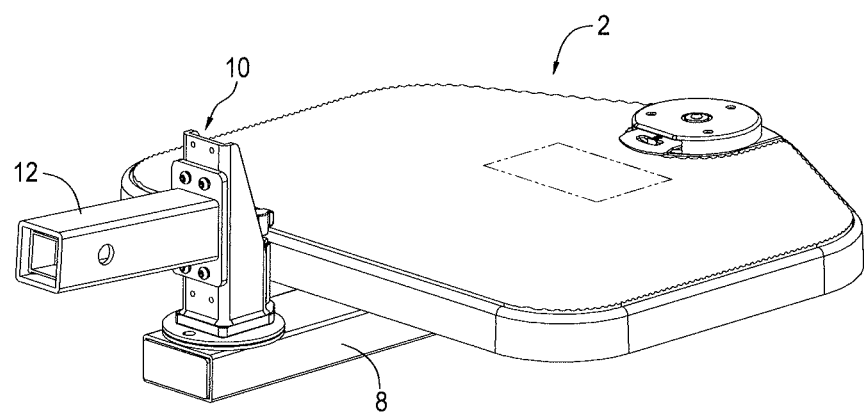
FIG. 3 is the inventive step in an intermediate position

FIG. 3 depicts the platform in a partially deployed position. Arm or beam 8 is extended and locked, but platform 2 has not been extended but is locked. It is to be understood that the platform is safe to use in this position, such as when the tailgate is not open.

Figure 4:
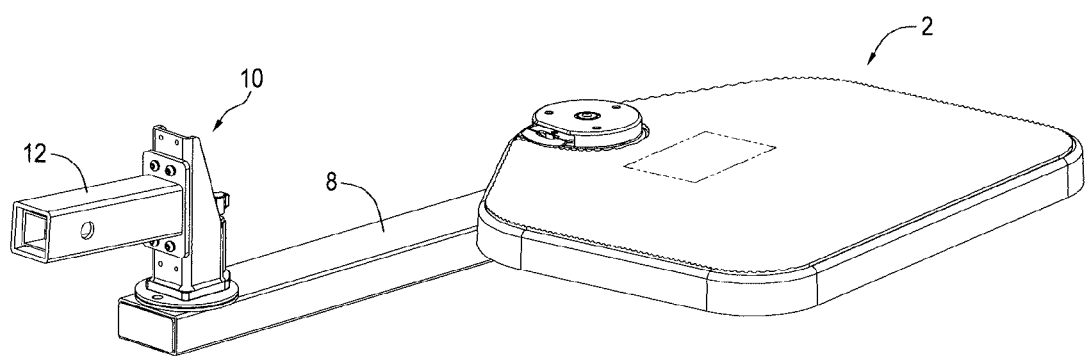
FIG. 4 is the inventive step in another intermediate position.

FIG. 4 depicts the platform in transition between that shown in FIG. 2 and FIG. 3.

Figure 5:
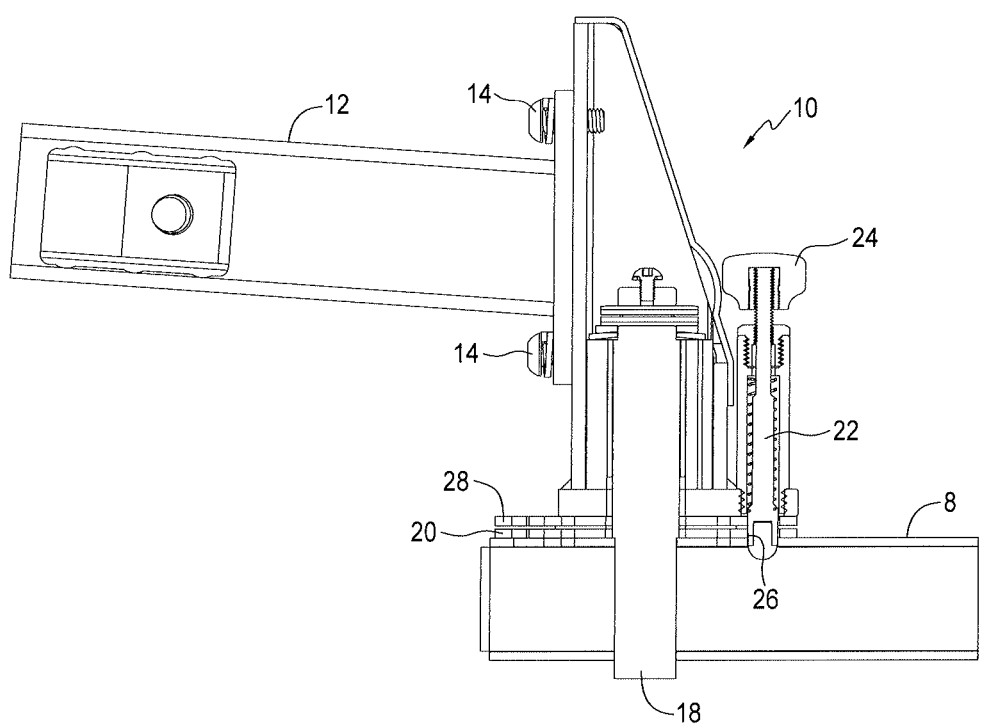
FIG. 5 is a sectional view of the inboard latching structure.

As best seen in FIG. 5, beam or arm 8 is pivotably mounted to shaft 12, which is inserted into the trailer hitch receptacle (not shown) by locking mechanism 10. Arm 8 is secured to rotatable shaft 18, washer 20 interfacing the fixed portion. Locking shaft 22, which is spring-biased to the downward position, controlled by handle 24, is locked in bore 26 in the extended position or in bore 28 in the retracted position. Shaft or arm 8 rotates 180° between the two positions.

Figure 6:
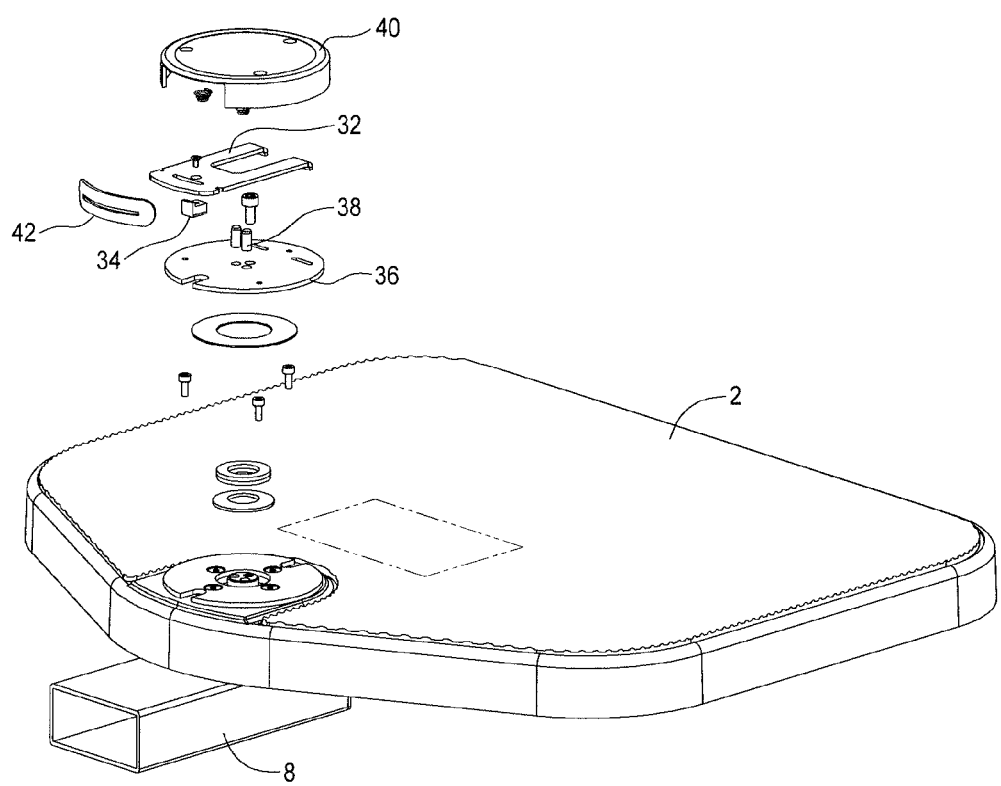
FIG. 6 is a partially exploded view of the platform latching structure.
Figure 7:
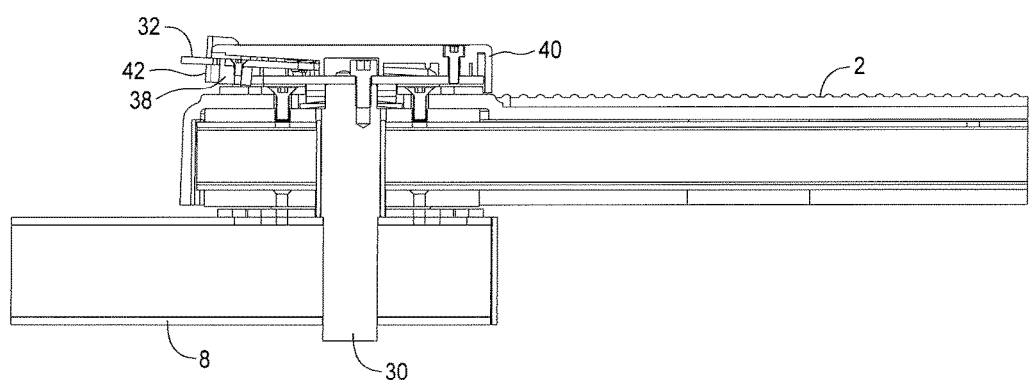
FIG. 7 is a sectional view of the platform latching structure.

Reference is now had to FIGS. 6 and 7, wherein the platform latching mechanism is illustrated. The platform 2 is rotated about shaft 30 secured to beam or arm 8 and latched in position by latch 32 and key 34. The latch 32 is keyed into disc 36, which is pinned to shaft 30 by pins 38. The entire assembly is protected by cap 40 and dust cover 42. T release the platform, the latch 32 must be lifted.

Thus, as can be seen, the present invention provides a safe, lightweight extendable platform which is easily secured beneath the vehicle but is extendable beyond a lowered tailgate.

Although a preferred embodiment of the invention has been disclosed for purposes of illustration, it should be understood that various changes, modifications and substitutions may be incorporated in the embodiment without departing from the spirit of the invention, which is defined by the claims which follow.

What is claimed is:

1. A stable, selectively extending platform apparatus for use with a motor vehicle having a tailgate, comprising:

a first section removably attachable to the vehicle;

an elongated second section, including a first end rotatable relative to the first section, said second section being selectively lockable in two positions, in a first, extended position located outwardly from the vehicle and in a second, retracted position located beneath the vehicle; and a third section, including a platform, rotatable relative to a second end of the second section and being selectively lockable, independent of locking of the second section, in two positions, a first position in which the platform extends beyond the second end of the second section, the first position being outward of the vehicle when the second section is in the second section's extended position, and a second position in which the platform is not extended beyond the second end of the second section and the platform is located beneath the vehicle when the second section is in second section's retracted position, so that the platform can be moved and locked into position independently of the locking of the second section so as to provide a step both when the tailgate of the vehicle is opened and when the tailgate is closed.

2. The platform of claim 1, wherein the first section includes a latching mechanism to which the second section is rotatably secured.

3. The platform of claim 1, wherein the third section rotates approximately 180° between the third section's two positions and wherein the second position of the third section is located outwardly from the vehicle when the second section is in the second section's extended position.

4. A stable, retractable platform apparatus for use with a vehicle having a tailgate, comprising:

a first section selectively secured to the vehicle;

a second elongated section having a first end which is rotatable relative to the first section, said second section being lockable in a first position in which the second section extends outwardly from the vehicle and lockable in a second position in which the second section is located beneath the vehicle; and a third section comprising a platform rotatable relative to a second end of said second section, wherein said platform is lockable, independent of locking of the second section, in a first position in which the platform is located outwardly from the vehicle when the second section is in the second section's first position and lockable in a second position in which the platform is also located outwardly from the vehicle when the second section is in the second section's first position but is located beneath the vehicle when the second section is in the second section's second position, so that the platform can be moved and locked into position independently of the locking of the second section so as to provide a step both when the tailgate of the vehicle is opened and when the tailgate is closed.

5. The retractable platform of claim 4, wherein the platform remains in one plane during movement thereof.

6. The retractable platform of claim 4, including a latch to release the platform.

* * * * *